(12) United States Patent
Lao et al.

(10) Patent No.: US 9,680,673 B2
(45) Date of Patent: Jun. 13, 2017

(54) COMMUNICATION SYSTEM AND METHOD

(71) Applicant: Realtek Semiconductor Corporation, Hsinchu (TW)

(72) Inventors: Heng Cheong Lao, Hsinchu (TW); Ta-Chin Tseng, New Taipei (TW); Shieh-Hsing Kuo, Hsinchu (TW); Sheng-Fu Chuang, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/060,617

(22) Filed: Mar. 4, 2016

(65) Prior Publication Data

US 2016/0269204 A1 Sep. 15, 2016

Related U.S. Application Data

(60) Provisional application No. 62/131,254, filed on Mar. 11, 2015.

(30) Foreign Application Priority Data

Oct. 28, 2015 (TW) .............................. 104135454 A

(51) Int. Cl.
  *H04L 25/49* (2006.01)
  *H04L 25/03* (2006.01)
  *H04B 3/50* (2006.01)
(52) U.S. Cl.
  CPC ........... *H04L 25/4923* (2013.01); *H04B 3/50* (2013.01); *H04L 25/03866* (2013.01); *H04L 25/4925* (2013.01)

(58) Field of Classification Search
  CPC ............ H04L 25/4917; H04L 25/4923; H04L 25/0272; H04L 25/4908; H04L 25/03866;
  (Continued)

(56) References Cited

U.S. PATENT DOCUMENTS

| | | | | |
|---|---|---|---|---|
| 5,633,631 A | * | 5/1997 | Teckman | ................. H03M 5/16 341/57 |
| 5,892,466 A | * | 4/1999 | Walker | ................ H04L 25/4925 341/57 |

(Continued)

FOREIGN PATENT DOCUMENTS

| | | |
|---|---|---|
| CN | 101150508 B | 11/2011 |
| EP | 1903733 A2 | 3/2008 |
| WO | 2009114608 A2 | 9/2009 |

OTHER PUBLICATIONS

R. J. Catchpole, "Efficient Ternary Transmission Codes," Electronics Letters, vol. 11, No. 20, Oct. 2, 1975, p. 482-484.

*Primary Examiner* — Vineeta Panwalkar
(74) *Attorney, Agent, or Firm* — CKC & Partners Co., Ltd.

(57) ABSTRACT

A communication system comprises a packet stream transforming unit, a mapping unit and a transmission unit. The packet stream transforming unit is configured to receive a 4-bit packet stream and transform the 4-bit packet stream into a 6-bit packet stream. The mapping unit is configured to map the 6-bit packet stream into multiple ternary bit streams, and the mapping unit maps at least one idle symbol into the ternary bit streams according to at least one particular bit of the at least one idle symbol of the 6-bit packet stream. The transmission unit is configured to transmit the ternary bit streams to a remote communication device through a cable.

17 Claims, 3 Drawing Sheets

(58) Field of Classification Search
CPC ....... H04L 25/4925; H03M 5/20; H03M 5/16; H03M 1/68; H04B 14/023; H04B 3/50
See application file for complete search history.

(56) References Cited

U.S. PATENT DOCUMENTS

| | | |
|---|---|---|
| 7,835,389 B2 | 11/2010 | Yu et al. |
| 8,422,512 B2 | 4/2013 | Yu et al. |
| 2006/0083257 A1* | 4/2006 | Price .......................... H04L 1/16 370/444 |
| 2008/0069144 A1* | 3/2008 | Yu ........................ H04L 25/4908 370/476 |

* cited by examiner

COMMUNICATION SYSTEM AND METHOD

RELATED APPLICATIONS

This application claims priority to U.S. Provisional Application Ser. No. 62/131,254 filed Mar. 11, 2015, and Taiwan Application Serial Number 104135454, filed Oct. 28, 2015, the disclosures of which are incorporated herein by reference in their entireties.

BACKGROUND

Field of Invention

The present disclosure relates to a communication system and method. More particularly, the present disclosure relates to a communication system and method for transmitting data through a cable.

Description of Related Art

For facilitating the development of networks, the Institute of Electrical and Electronics Engineers (IEEE) has formulated standards for network which may have different transmission rates and transmission mediums. With tremendous effort to develop the networks, the transmission rate of wired cable is now up to 1 Giga bit per second (Gbps).

With respect to framework of network transmission, line coding represents important technology corresponding to a physical layer (PHY) and a data link layer of a wired Ethernet network. Line coding is adopted to encode source data, and the encoded source data is then transmitted through the wired cable. Furthermore, line coding can be implemented according to characteristics of the transmission mediums. Accordingly, line coding plays an important role for the quality of the network transmissions.

DETAILED DESCRIPTION

Figure 1A:
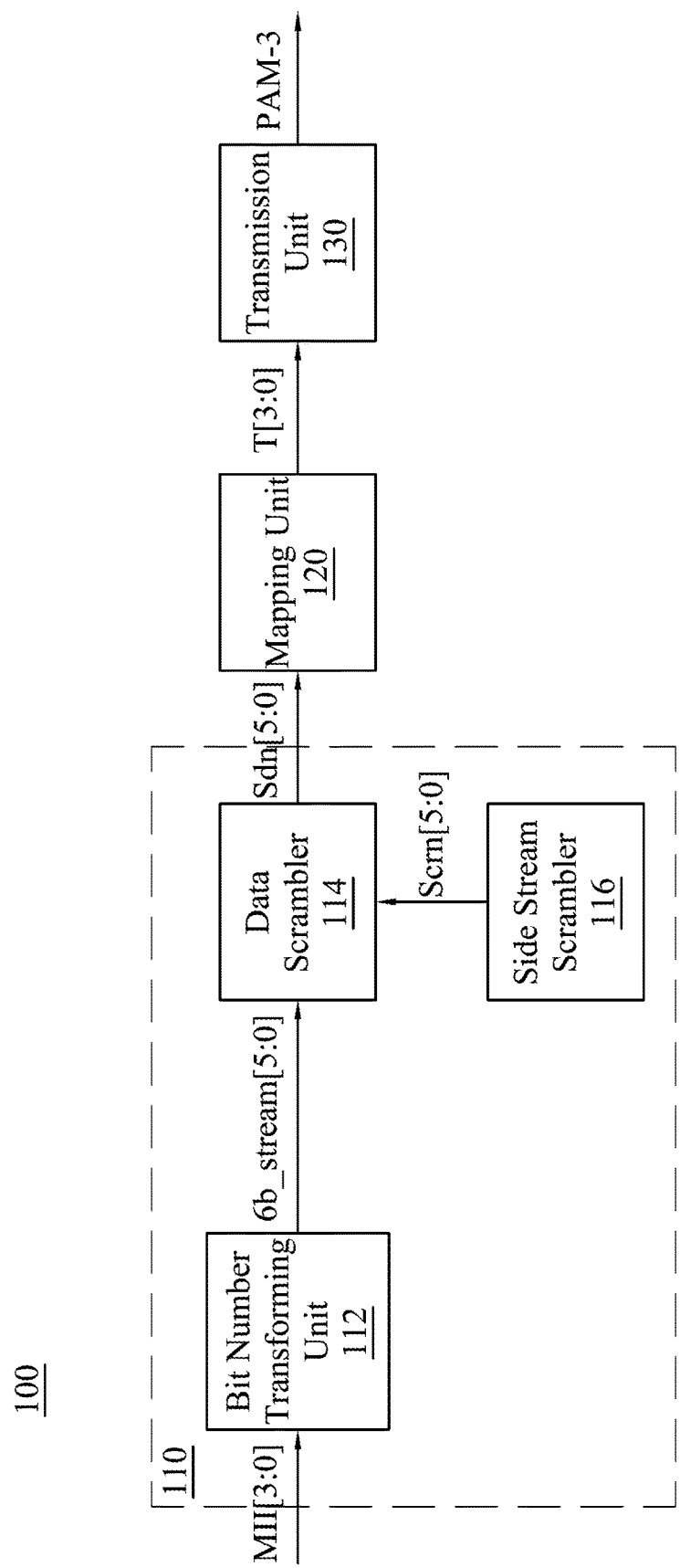
FIG. 1A is a block schematic diagram of a communication system according to embodiments of the present disclosure.

The following disclosure provides many different embodiments, or examples, for implementing different features of the provided subject matter. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a block schematic diagram of a communication system according to embodiments of the present disclosure. The communication system 100 mainly comprises a physical layer (PHY) of an open system interconnection reference model. The PHY receives media independent interface data from media access control of a data link layer, and executes line encoding for the media independent interface data to generate line code. The line code is then transmitted to a remote communication device through a cable (not shown). To enhance the correct rate for the remote communication device to decode the line code, the line code should be prevented from having multiple continuous logical levels with the same logical level, so that the remote communication device is prevented from having wrong bit length analysis for the line coding. Detailed introduction regarding components and functions thereof in the communication system 100 are described below.

The communication system 100 comprises a packet stream transforming unit 110, a mapping unit 120 and a transmission unit 130. The packet stream transforming unit 110 is configured to receive a 4-bit packet stream and transform the 4-bit packet stream into a 6-bit packet stream. The mapping unit 120 is configured to map the 6-bit packet stream into multiple ternary bit streams, and the mapping unit 120 maps an idle symbol into the ternary bit streams according to at least one particular bit of the idle symbol of the 6-bit packet stream. The transmission unit 130 is configured to transmit the ternary bit streams to the remote communication device through the cable. To implement arrangements mentioned above, the packet stream transforming unit 110, the mapping unit 120 and the transmission unit 130 comprise appropriate logic gates, circuits and/or encoding methods. In one embodiment, the above-mentioned ternary bits of the ternary bit streams have three bit symbols of −1, 0 and 1.

When the mapping unit 120 in the present disclosure maps the 6-bit packet stream into the ternary bit streams, the number of possible combinations of ternary bits of the ternary bit streams has at least three more numbers than the number of possible combinations of binary bits of the 6-bit packet stream. Accordingly, when the mapping unit 120 maps the idle symbol of the 6-bit packet stream into the ternary bit streams, the combinations of the ternary bits of the ternary bit streams mapped from the idle symbol have more flexibility. Therefore, the combinations of the ternary bits of the reduced ternary bit streams having multiple continuous nonzero logical levels with the same logical level can be adopted. In other words, the communication system 100 is able to improve baseline wandering, and enhances the success rate for the remote communication device to decode the line code, so that a better communication quality can be achieved.

The packet stream transforming unit 110 comprises a bit number transforming unit 112, a data scrambler 114 and a side stream scrambler 116. The bit number transforming unit 112 comprises appropriate logic gates, circuits and/or encoding methods. The bit number transforming unit 112 is configured to receive the 4-bit packet stream MII[3:0] from the media independent interface (not depicted in FIG. 1A), and transform the 4-bit packet stream into the 6-bit data stream 6b_stream[5:0].

In one embodiment, the bit number transforming unit 112 transforms the 4-bit packet stream MII[3:0] into the 6-bit data stream 6b_stream[5:0] through a padding method directly. In another embodiment, the bit number transforming unit 112 of the packet stream transforming unit 110 transforms the 4-bit packet stream MII[3:0] into a 3-bit packet stream (4b3b), then transforms the 3-bit packet stream into the 6-bit data stream 6b_stream[5:0] through a First-In First-Out (FIFO) method.

The data scrambler 114 and the side stream scrambler 116 comprise appropriate logic gates, circuits and/or encoding methods. The data scrambler 114 and the side stream scrambler 116 are configured to scramble the number of bit symbols of 0 and 1 of the binary 6-bit data stream 6b_stream[5:0], to equalize the number of bit symbols of 0 and 1 of the scrambled binary 6-bit data stream 6b_stream[5:0] which is called 6-bit scrambled data stream $Sd_n[5:0]$. With such arrangements, signals (e.g., 6-bit scrambled data stream) have randomness, and a rata for the remote communication device representing a receiver to capture clock frequencies of the received signals is therefore enhanced. When the data scrambler 114 and the side stream scrambler 116 scramble the 6-bit data stream 6b_stream[5:0], the side stream scrambler 116 adopts a scrambler polynomial to generate a scramble value $Scr_n[5:0]$. Specifically, when order of the scrambler polynomial increases, the randomness of the 6-bit scrambled data stream $Sd_n[5:0]$ becomes more significant.

Figure 1B:
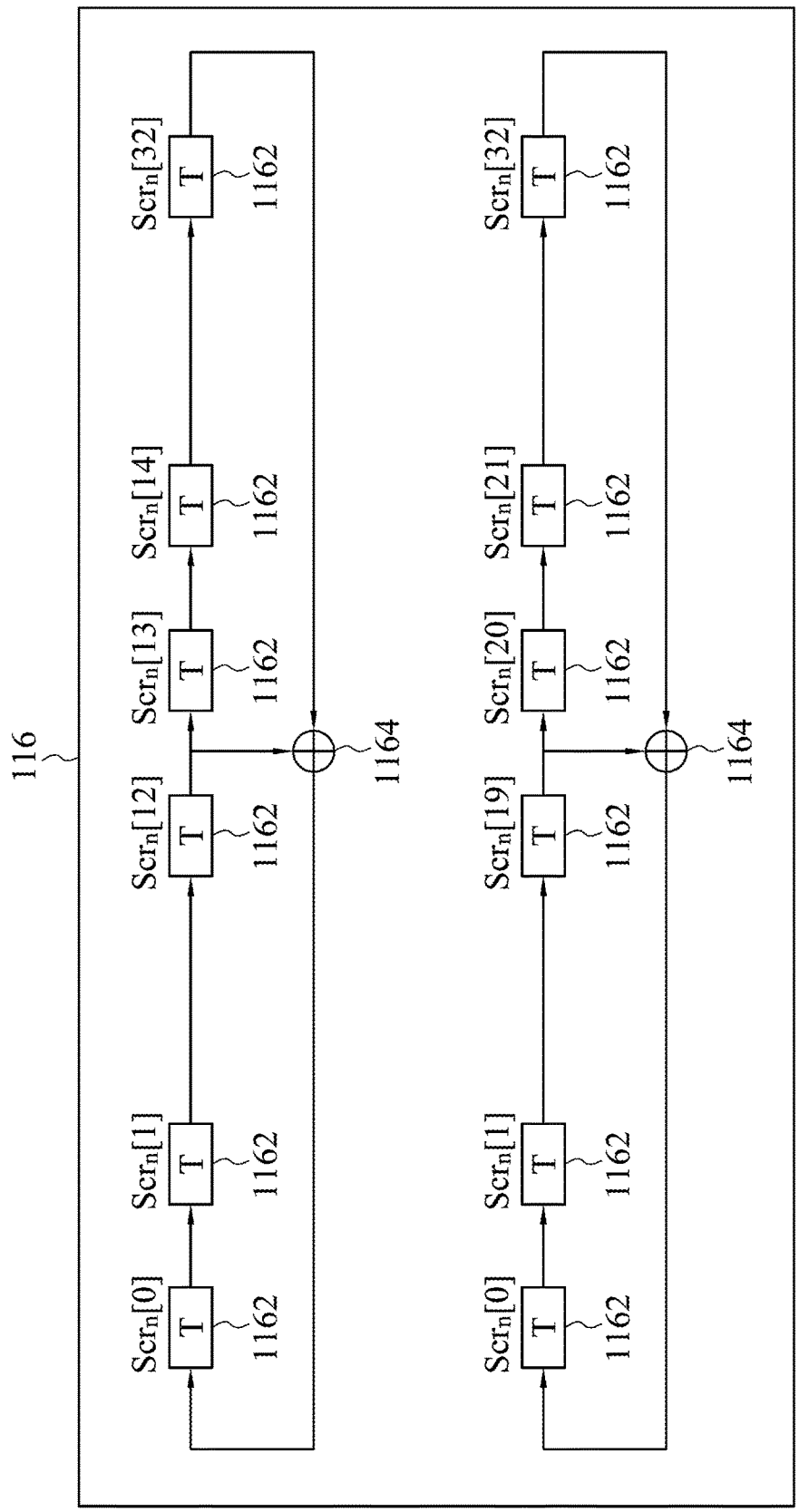
FIG. 1B is a block schematic diagram of a side stream scrambler according to embodiments of the present disclosure.

In one embodiment, the scrambler polynomial adopted by the side stream scrambler 116 is $g_M(x)=1+x^{13}+x^{33}$. In another embodiment, the scrambler polynomial adopted by the side stream scrambler 116 is $g_S(x)=1+x^{20}+x^{33}$. FIG. 1B is a block schematic diagram of a side stream scrambler 116 according to embodiments of the present disclosure. The side stream scrambler 116 comprises a delayer 1162 and an adder 1164. The upper section of FIG. 1B is configured to generate the scramble value $Scr_n[5:0]$ according to the scrambler polynomial $g_M(x)=1+x^{13}+x^{33}$. The lower section of FIG. 1B is configured to generate the scramble value $Scr_n[5:0]$ according to the scrambler polynomial $g_S(x)=1+x^{20}+x^{33}$.

The data scrambler 114 receives the scramble value $Scr_n[5:0]$ from the side stream scrambler 116 and the 6-bit data stream 6b_stream[5:0], to generate 6-bit scrambled data stream $Sd_n[5:0]$. The data scrambler 114 firstly adopts polynomial $g(x)=x^3 \hat{} x^8$, $Scr_n[0]$ and $Scr_{(n-1)}[0]$ of the scramble value $Scr_n[5:0]$ to generate a first scrambled middle-value stream $Sy_n[2:0]$. Equations corresponding to the first scrambled middle-value stream $Sy_n[2:0]$ are as follows:

$$Sy_n[0]=Scr_n[0]$$

$$Sy_n[1]=g(Scr_n[0])=Scr_n[3] \hat{} Scr_n[8]$$

$$Sy_n[2]=g^2(Scr_n[0])=Scr_n[6] \hat{} Scr_n[16]$$

Reference is now made to the above equations, $Sy_{(n-1)}[2:0]$ is thus obtained by replacing subscripts n of the above equations with subscripts (n−1).

After the data scrambler 114 generates the first scrambled middle-value stream $Sy_n[2:0]$, the data scrambler 114 determines a second scrambled middle-value stream $Sc_n[5:0]$ according to the first scrambled middle-value stream $Sy_n[2:0]$ and a received transmission mode signal tx_mode. Equations corresponding to the second scrambled middle-value stream $Sc_n[5:0]$ are as follows:

$$Sc_n[5:4] = \begin{cases} [0\ 0], & \text{if (tx\_mode = SEND\_Z)} \\ Sy_{(n-1)}[2:1], & \text{else} \end{cases}$$

$$Sc_n[3] = \begin{cases} 0, & \text{if (tx\_mode = SEND\_Z)} \\ Sy_{(n-1)}[0], & \text{else} \end{cases}$$

$$Sc_n[2:1] = \begin{cases} [0\ 0], & \text{if (tx\_mode = SEND\_Z)} \\ Sy_n[2:1], & \text{else} \end{cases}$$

$$Sc_n[0] = \begin{cases} 0, & \text{if (tx\_mode = SEND\_Z)} \\ Sy_n[0], & \text{else} \end{cases}$$

After the data scrambler 114 generates the second scrambled middle value stream $Sc_n[5:0]$, the data scrambler 114 determines the 6-bit scrambled data stream $Sd_n[5:0]$ according to the second scrambled middle-value stream $Sc_n[5:0]$, a received transmission enable signal tx_enable and a local receiver status loc_rcvr_status. Equations corresponding to the 6-bit scrambled data stream $Sd_n[5:0]$ are as follows:

$$Sd_n[5] = \begin{cases} Sc_n[5] \hat{} 6b\_stream_{(n)}[5], & \text{if (tx\_enable}_{(n-6)} = 1) \\ Sc_n[5] \hat{} 1, & \text{else if (loc\_rcvr\_status = OK)} \\ Sc_n[5], & \text{else} \end{cases}$$

$$Sd_n[4:0] = \begin{cases} Sc_n[4:0] \hat{} 6b\_stream_{(n)}[4:0], & \text{if (tx\_enable}_{(n-6)} = 1) \\ Sc_n[4:0], & \text{else} \end{cases}$$

With respect to the 6-bit data stream 6b_stream[5:0], the second scrambled middle-value stream $Sc_n[5:0]$ and the 6-bit scrambled data stream $Sd_n[5:0]$, six binary bits are regarded as a unit of the foregoing streams. Therefore, the 6-bit data stream 6b_stream[5:0], the second scrambled middle value stream $Sc_n[5:0]$ and the 6-bit scrambled data stream $Sd_n[5:0]$ are the 6-bit packet streams. Furthermore, the 6-bit data stream 6b_stream[5:0], the second scrambled middle value stream $Sc_n[5:0]$, the 6-bit scrambled data stream $Sd_n[5:0]$ and the transmission enable signal tx_enable are clock signals. Specifically, the digital number of n represents the latest signal, and other digital numbers in brackets (e.g., n−1, n−6) represent the time difference between the latest signal and a signal corresponding to the digital number in brackets.

The packet stream transforming unit 110 outputs the 6-bit scrambled data stream $Sd_n[5:0]$ which has been scrambled and randomized. The mapping unit 120 of the communication system 100 receives the 6-bit scrambled data stream $Sd_n[5:0]$ comprising at least one idle symbol, and each of the idle symbols comprises six binary bits. The mapping units 120 maps the 6-bit scrambled data stream $Sd_n[5:0]$ into the ternary bit streams, to transmit the ternary bit streams to the remote communication device through the cable.

In one embodiment, the mapping unit 120 maps data symbols of the 6-bits scrambled data stream $Sd_n[5:0]$ into four ternary bit streams (6B4T) through a map table. The map table is shown as Table. 1.

TABLE 1

The map table adopted to map the data symbols of the 6-bits packet stream into the ternary bit streams.

| Sd$_n$[5:0] | T1 | T2 | T3 | T4 |
|---|---|---|---|---|
| 000000 | 0 | −1 | 0 | 1 |
| 000001 | −1 | −1 | 0 | 1 |
| 000010 | 0 | −1 | 0 | −1 |
| 000011 | 1 | −1 | 0 | 0 |
| 000100 | 0 | −1 | 0 | 0 |
| 000101 | 1 | −1 | 0 | −1 |
| 000110 | 1 | −1 | 0 | 1 |
| 000111 | −1 | −1 | 0 | 0 |
| 001000 | 0 | 0 | 0 | 1 |
| 001001 | −1 | 0 | 0 | 1 |
| 001010 | 0 | 1 | 1 | −1 |
| 001011 | 1 | 1 | 1 | 0 |
| 001100 | −1 | 1 | 1 | −1 |
| 001101 | 1 | 1 | 1 | −1 |
| 001110 | 0 | 1 | 1 | 0 |
| 001111 | −1 | 1 | 1 | 0 |
| 010000 | 0 | 1 | −1 | 1 |
| 010001 | −1 | 1 | −1 | 1 |
| 010010 | 0 | 1 | −1 | −1 |
| 010011 | 1 | 1 | −1 | 0 |
| 010100 | 0 | 1 | −1 | 0 |
| 010101 | 1 | 1 | −1 | −1 |
| 010110 | −1 | 1 | −1 | −1 |
| 010111 | −1 | 1 | −1 | 0 |
| 011000 | 0 | −1 | −1 | 1 |
| 011001 | −1 | −1 | −1 | 1 |
| 011010 | 0 | 0 | 0 | −1 |
| 011011 | 1 | −1 | −1 | 0 |
| 011100 | 1 | −1 | −1 | 1 |
| 011101 | 1 | 0 | 0 | −1 |
| 011110 | 0 | −1 | −1 | 0 |
| 011111 | 1 | −1 | −1 | 0 |
| 100000 | 0 | 1 | 0 | 1 |
| 100001 | −1 | 1 | 0 | 1 |
| 100010 | 0 | 1 | 0 | −1 |
| 100011 | 1 | 1 | 0 | 0 |
| 100100 | 0 | 1 | 0 | 0 |
| 100101 | 1 | 1 | 0 | −1 |
| 100110 | −1 | 1 | 0 | −1 |
| 100111 | −1 | 1 | 0 | 0 |
| 101000 | 0 | 0 | −1 | 1 |
| 101001 | −1 | 0 | −1 | 1 |
| 101010 | 0 | 0 | −1 | −1 |
| 101011 | 1 | 0 | −1 | 0 |
| 101100 | −1 | 0 | −1 | −1 |
| 101101 | 1 | 0 | −1 | −1 |
| 101110 | 0 | 0 | −1 | 0 |
| 101111 | −1 | 0 | −1 | 0 |
| 110000 | 0 | −1 | 1 | 1 |
| 110001 | −1 | −1 | 1 | 1 |
| 110010 | 0 | −1 | 1 | 1 |
| 110011 | 1 | −1 | 1 | −1 |
| 110100 | 0 | −1 | 1 | 0 |
| 110101 | 1 | −1 | 1 | 0 |
| 110110 | 1 | −1 | 1 | −1 |
| 110111 | −1 | −1 | 1 | 1 |
| 111000 | 0 | 0 | 1 | 1 |
| 111001 | −1 | 0 | 1 | 1 |
| 111010 | 0 | 0 | 1 | −1 |
| 111011 | 1 | 0 | 1 | 0 |
| 111100 | 1 | 0 | 1 | 1 |
| 111101 | 1 | 0 | 1 | −1 |
| 111110 | 0 | 0 | 1 | 0 |
| 111111 | −1 | 0 | 1 | 0 |

When the mapping unit 120 maps the idle symbol into the ternary bit streams, the mapping units 120 determines ternary values of the ternary bit streams mapped from the idle symbol according to the particular bit of the idle symbol. In one embodiment, the mapping unit 120 maps the idle symbol into the ternary bit streams according to the particular bits comprising a least significant bit. In other words, the mapping unit 120 determines a ternary value of a first bit stream T1 of the ternary bit streams according to a binary value of the least significant bit.

Specifically, in another embodiment, when the least significant bit has a bit symbol of 0, the mapping unit 120 determines the ternary value of the first bit stream T1 to have a bit symbol of 0. When the least significant bit has a nonzero bit symbol, the mapping unit 120 determines the ternary value of the first bit stream T1 to have a nonzero bit symbol (i.e., a bit symbol of 1 or −1). With the arrangements for encoding mentioned above, the efficiency and success rate for the remote communication device representing the receiver to lock in a clock of the received line coding are therefore enhanced.

In further embodiment, the mapping unit 120 maps the idle symbol into the ternary bit streams according to the particular bit comprising a first middle bit and a most significant bit. The mapping unit 120 is configured to determine a ternary value of a second bit stream T2 of the ternary bit streams according to binary values of the first middle bit and the most significant bit. Specifically, the mapping unit 120 adopts Sd$_n$[3] of the 6-bit scrambled data stream Sd$_n$[5:0] as the first middle bit. When the first middle bit and the most significant bit have bit symbols of 0 at the same time, the ternary value of the second bit stream T2 has a bit symbol of 0; otherwise, the ternary value of the second bit stream T2 has a nonzero bit symbol.

In further embodiment, the mapping unit 120 maps the idle symbol into the ternary bit streams according to the particular bit comprising a first middle bit and a second middle bit. The mapping unit 120 is configured to determine a ternary value of a third bit stream T3 of the ternary bit streams according to binary values of the first middle bit and the second middle bit. Specifically, the mapping unit 120 adopts Sd$_n$[3] of the 6-bit scrambled data stream Sd$_n$[5:0] as the first middle bit, and adopts Sd$_n$[4] of the 6-bit scrambled data stream Sd$_n$[5:0] as the second middle bit. When the first middle bit and the second middle bit have bit symbols of 1 at the same time, the ternary value of the third bit stream T3 has a bit symbol of 0; otherwise, the ternary value of the third bit stream T3 has a nonzero bit symbol.

In one embodiment, with all arrangements for encoding mentioned above, the mapping unit 120 is configured to map the idle symbol of the binary 6-bit packet stream into the four ternary bits streams (6B4T) through a map table. The map table thereof is shown as Table. 2.

TABLE 2

The map table adopted to map the idle symbol of the 6-bits packet stream into the ternary bit streams.

| Sdn[5:0] | T1 | T2 | T3 | T4 |
|---|---|---|---|---|
| 000000 | 0 | 0 | 1 | 1 |
| 000001 | −1 | 0 | 1 | 1 |
| 000010 | 0 | 0 | 1 | −1 |
| 000011 | 1 | 0 | 1 | 0 |
| 000100 | 0 | 0 | 1 | 0 |
| 000101 | 1 | 0 | 1 | −1 |
| 000110 | 0 | 0 | 1 | 1 |
| 000111 | −1 | 0 | 1 | 0 |
| 001000 | 0 | −1 | 1 | 1 |
| 001001 | −1 | −1 | 1 | 1 |
| 001010 | 0 | −1 | 1 | −1 |
| 001011 | 1 | −1 | 1 | 0 |
| 001100 | 0 | −1 | 1 | −1 |
| 001101 | 1 | −1 | 1 | −1 |
| 001110 | 0 | −1 | 1 | 0 |
| 001111 | −1 | −1 | 1 | 0 |
| 010000 | 0 | 0 | −1 | 1 |

TABLE 2-continued

The map table adopted to map the idle symbol of the
6-bits packet stream into the ternary bit streams.

| Sdn[5:0] | T1 | T2 | T3 | T4 |
|---|---|---|---|---|
| 010001 | −1 | 0 | −1 | 1 |
| 010010 | 0 | 0 | −1 | −1 |
| 010011 | 1 | 0 | −1 | 0 |
| 010100 | 0 | 0 | −1 | 0 |
| 010101 | 1 | 0 | −1 | −1 |
| 010110 | 0 | 0 | −1 | 1 |
| 010111 | −1 | 0 | −1 | 0 |
| 011000 | 0 | 1 | 0 | 1 |
| 011001 | −1 | 1 | 0 | 1 |
| 011010 | 0 | 1 | 0 | −1 |
| 011011 | 1 | 1 | 0 | 0 |
| 011100 | 0 | 1 | 0 | −1 |
| 011101 | 1 | 1 | 0 | −1 |
| 011110 | 0 | 1 | 0 | 0 |
| 011111 | −1 | 1 | 0 | 0 |
| 100000 | 0 | −1 | −1 | 1 |
| 100001 | −1 | −1 | −1 | 1 |
| 100010 | 0 | −1 | −1 | −1 |
| 100011 | 1 | −1 | −1 | 0 |
| 100100 | 0 | −1 | −1 | 0 |
| 100101 | 1 | −1 | −1 | −1 |
| 100110 | 0 | −1 | −1 | 1 |
| 100111 | −1 | −1 | −1 | 0 |
| 101000 | 0 | 1 | −1 | 1 |
| 101001 | −1 | 1 | −1 | 1 |
| 101010 | 0 | 1 | −1 | −1 |
| 101011 | 1 | 1 | −1 | 0 |
| 101100 | 0 | 1 | −1 | −1 |
| 101101 | 1 | 1 | −1 | −1 |
| 101110 | 0 | 1 | −1 | 0 |
| 101111 | −1 | 1 | −1 | 0 |
| 110000 | 0 | 1 | 1 | 1 |
| 110001 | −1 | 1 | 1 | 1 |
| 110010 | 0 | 1 | 1 | −1 |
| 110011 | 1 | 1 | 1 | 0 |
| 110100 | 0 | 1 | 1 | 0 |
| 110101 | 1 | 1 | 1 | −1 |
| 110110 | 0 | 1 | 1 | 1 |
| 110111 | −1 | 1 | 1 | 0 |
| 111000 | 0 | −1 | 0 | 1 |
| 111001 | −1 | −1 | 0 | 1 |
| 111010 | 0 | −1 | 0 | −1 |
| 111011 | 1 | −1 | 0 | 0 |
| 111100 | 0 | −1 | 0 | −1 |
| 111101 | 1 | −1 | 0 | −1 |
| 111110 | 0 | −1 | 0 | 0 |
| 111111 | −1 | −1 | 0 | 0 |

In Table. 1 and Table. 2, serial numbers of the first bit stream T1~the fourth bit stream T4 are configured to distinguish from the different ternary bits, but not to limit sequence among the ternary bits. In other words, the serial numbers of the first bit stream T1~the fourth bit stream T4 are able to be exchanged.

Traditional line coding is configured to transform the 4-bit packet stream received from the media independent interface into the 3-bit packet stream, and map the 3-bit packet stream into two ternary bit streams directly. However, the number of possible combinations of two ternary bits of two ternary bit streams (i.e., $3^2$) merely has one more than the number of possible combinations of three binary bits of the 3-bit packet stream (i.e., $2^3$), which limits the combinations of the ternary bits of the ternary bit streams. Therefore, the combinations of the ternary bits of the ternary streams are not enough for line encoding circuits to add additional symbols (e.g., delimiters for marking) to the ternary bit streams, so that the ternary bit streams have multiple continuous nonzero ternary values with the same nonzero ternary values, leading to the baseline to wander significantly.

Furthermore, referring to Table. 1 and Table. 2 mentioned above, when the binary 6-bit packet stream is transformed into four ternary bits streams, it is known that the number of the possible combinations of the binary 6-bit packet stream is 64 (i.e., $2^6$) and the number of the possible combinations of four ternary bit streams is 81 (i.e., $3^4$). Accordingly, the number of remaining combinations of the ternary bit streams is 17. Therefore, the mapping unit 120 adopts the remaining combinations of the ternary bit streams as the delimiters among different packet except the remaining combinations of ternary bit streams having four continuous same ternary values (i.e., {0, 0, 0, 0}, {1, 1, 1, 1} and {−1, −1, −1, −1}) resulting in the baseline wandering. The delimiter can be a Start Stream Delimiter (SSD), an End Stream Delimiter (ESD) or an Error End Stream Delimiter (ERR_ESD). The SSD is configured to mark the start of the packets, the ESD is configured to mark the end of the packets, and the ERR_ESD is configured to mark the end of the packets and notify of the abnormality of the packets.

In one embodiment, the mapping unit 120 adds the delimiter into the ternary bit streams, and the delimiter has three continuous nonzero ternary values being not exactly the same. In other words the delimiter does not have three continuous nonzero ternary values with the same nonzero ternary values. According to Table. 2, the mapping unit 120 adopts the combinations of four ternary bit streams as the delimiters except the combinations of the ternary bit streams adopted for the idle symbols and the combinations of the ternary bit streams having four continuous same ternary values. For illustration, {0, 1, 1, 1} and {−1, 1, 1, 1} have three continuous bit symbols of 1. Specifically, in one embodiment, the mapping unit 120 adopts continuous {1, 1, 0, 0} and {1, 1, 0, 0} as the SSD, and adopts continuous {−1, −1, 0, 0} and {−1, −1, 0, 0} as the ESD. Furthermore, the mapping unit 120 adopts continuous {1, −1, 0, 0} and {−1, 1, 0, 0} as the ERR_ESD. Therefore, the baseline wander is improved from the remote communication device representing the receiver, and the remote communication device is able to successfully decode the transmitted line code.

In further embodiment, the transmission unit 130 receives the encoded ternary bit streams T[3:0] (i.e., the ternary bit streams comprising T1, T2, T3 and T4) from the mapping unit 120, and then transmits the ternary bit streams T[3:0] to the remote communication device through a PAM-3 encoding method via the cable. In one embodiment, the cable is a twisted pair. The transmission unit 130 arranges the ternary bit streams T[3:0] in the order of {T1, T2, T3, T4} or {T4, T3, T2, T1}, and transmits the ternary bit streams T[3:0] to the remote communication device through the twisted pair. In another embodiment, the cable comprises four twisted pairs. The transmission unit 130 transmits each of the ternary bits of the ternary bit streams T[3:0] through the corresponding twisted pairs respectively.

The communication system 100 firstly transforms the 4-bit packet stream into the 6-bit packet stream, and then transforms the 6-bit packet stream into the ternary bit streams. With such arrangements, the communication system 100 configured to transform the 4-bit packet stream into the ternary bit streams that have higher flexibility, and the transmitted line code is thus prevented from having continuously the same bit values. Therefore, baseline wandering is improved significantly, and the correct rate for the remote communication device to decode the line code is enhanced. Furthermore, with the arrangements for encoding, the mapping unit 120 of the communication system 100 makes the remote communication device representing the receiver capture clock information of the line code effectively, so that better communication quality is achieved. According to some empirical data relating to the power spectral density of transmission data, the technical scheme of the present disclosure performs better than traditional technical scheme of transforming three binary bits into two ternary bits.

Figure 2:
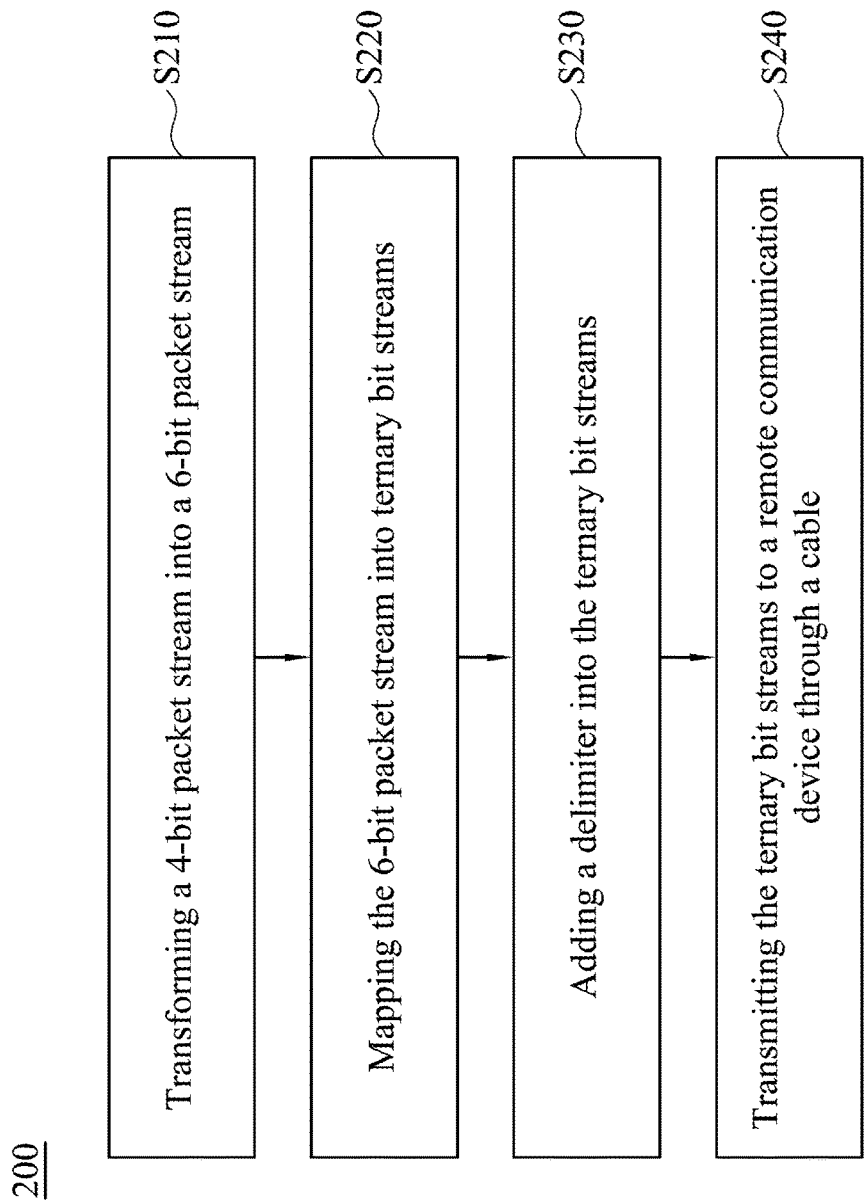
FIG. 2 is a flow chart of a communication method according to embodiments of the present disclosure.

Reference is now made to FIG. 2. FIG. 2 is a block schematic diagram of a side stream scrambler according to embodiments of the present disclosure. Even though steps of communication method 200 described in the flow chart follows a particular sequence, but the sequence of the steps mentioned in the present disclosure is not limited thereto. For facilitating the understanding of the present disclosure, the communication system 100 (depicted in FIG. 1A) executing the communication method 200 is used for illustration. However, the present disclosure is not limited to the illustration given above.

Firstly, the communication system 100 receives the 4-bit packet stream from the media independent interface, and transforms the 4-bit packet stream into the 6-bit packet stream (operation S210).

The communication system 100 maps the 6-bit packet stream into the ternary bit streams, and maps the at least one idle symbol into the ternary bit streams according to the at least one idle symbol of the 6-bit stream (operation S220). In one embodiment, when the communication system 100 maps the 6-bit packet stream into the ternary bit streams, the communication system 100 adopts the particular bit comprising the least significant bit. The communication system 100 determines the ternary value of the first bit stream of the ternary bit streams according to the least significant bit of the idle symbol. Specifically, when the least significant bit has a bit symbol of 0, the communication system 100 determines the ternary value of the first bit stream to have a bit symbol of 0; otherwise, the communication system 100 determines the ternary value of the first bit stream to have a nonzero bit symbol.

In another embodiment, when the communication system 100 maps the 6-bit packet stream into the ternary bit streams, the communication system 100 adopts the particular bit comprising the first middle bit and the most significant bit. The communication system 100 determines the ternary value of the second bit stream of the ternary bit streams according to the first middle bit and the most significant bit. In further embodiment, when the communication system 100 maps the 6-bit packet stream into the ternary bit streams, the communication system 100 adopts the particular bit comprising the first middle bit and the second middle bit. The communication system 100 determines the ternary value of the third bit stream of the ternary bit streams according to the first middle bit and the second middle bit.

The communication system 100 maps the data symbol and the idle symbols of the 6-bit packet stream into the ternary bit streams. In one embodiment, the number of the ternary bits of the ternary bit streams is 4, the number of combinations of four ternary bits (i.e., $3^4$) is higher than the number of combinations of six binary bits (i.e., $2^6$). With such arrangements, the communication system 100 has more selections to map the binary 6-bit packet stream into the ternary 4-bits stream. Furthermore, the communication system 100 has more flexibility to map the 6-bit packet stream into the ternary stream.

The communication system 100 adds the delimiter into the ternary bit streams (operation S230), and adopts the remaining combinations of the ternary bits of the ternary bit streams except the ternary bit streams having three continuous nonzero ternary values with the same nonzero ternary values. In other words, three continuous nonzero ternary values of the delimiter are not exactly the same. With the above arrangements, baseline wandering can be improved, and the correct rate for data transmission is able to be enhanced.

After the communication system 100 maps the 6-bit packet stream into the ternary bit streams, the communication system 100 transmits the ternary bit streams to the remote communication device (operation S240). In one embodiment, the communication system 100 transmits the ternary bit streams through the PAM-3 encoding method.

The detailed implementation of the steps mentioned above is the same as that of the steps mentioned previously, so the related descriptions are omitted here.

As described above, the communication system and the communication method in the present disclosure are able to improve the baseline wandering for the remote communication device. Furthermore, the arrangements for encoding in the present disclosure are as follows: transforming the 6-bit packet stream into the ternary bit streams having at least four ternary bits; and determines the ternary values of the ternary bit streams according to the particular bit of the 6-bits packet stream. With the arrangements for encoding, the remote communication device can lock in the clock information of the line code effectively, and decode the line code correctly. Therefore, the error rate of a wired network communication is reduced, and the transmission efficiency is enhanced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present invention cover modifications and variations of this present disclosure provided they fall within the scope of the following claims.

What is claimed is:

1. A communication system, comprising:
    a packet stream transforming unit configured to receive a 4-bit packet stream and transform the 4-bit packet stream into a 6-bit packet stream;
    a mapping unit configured to map the 6-bit packet stream into a plurality of ternary bit streams, and the mapping unit maps at least one idle symbol into the ternary bit streams in accordance with at least one particular bit of the at least one idle symbol of the 6-bit packet stream; and
    a transmission unit configured to transmit the ternary bit streams to a remote communication device through a cable.

2. The communication system of claim 1, wherein the at least one particular bit comprises a least significant bit, and the mapping unit is configured to determine a ternary value of a first bit stream of the ternary bit streams in accordance with a binary value of the least significant bit.

3. The communication system of claim 1, wherein the at least one particular bit comprises a first middle bit and a most significant bit, and the mapping unit is configured to determine a ternary value of a second bit stream of the ternary bit streams in accordance with binary values of the first middle bit and the most significant bit.

4. The communication system of claim 1, wherein the at least one particular bit comprises a first middle bit and a second middle bit, and the mapping unit is configured to determine a ternary value of a third bit stream of the ternary bit streams in accordance with binary values of the first middle bit and the second middle bit.

5. The communication system of claim 1, wherein the mapping unit adds at least one delimiter into the ternary bit streams, and three continuous nonzero ternary values of the at least one delimiter are not exactly the same.

6. The communication system of claim 1, wherein the packet stream transforming unit further comprising:
   a bit number transforming unit configured to receive the 4-bit packet stream and transform the 4-bit packet stream into the 6-bit packet stream;
   a data scrambler; and
   a side stream scrambler, wherein the data scrambler and the side stream scrambler are configured to scramble the number of bit symbols of 0 and 1 of the 6-bit packet stream.

7. The communication system of claim 6, wherein the bit number transforming unit is configured to transform the 4-bit packet stream into the 6-bit packet stream through a padding method.

8. The communication system of claim 6, wherein the bit number transforming unit is configured to transform the 4-bit packet stream into a 3-bit packet stream, then transform the 3-bit packet stream into the 6-bit packet stream through a first-in first-out method.

9. The communication system of claim 6, wherein the side stream scrambler comprises a delayer and an adder.

10. A communication method, comprising:
    transforming a 4-bit packet stream into a 6-bit packet stream;
    mapping the 6-bit packet stream into a plurality of ternary bit streams, and mapping at least one idle symbol into the ternary bit streams in accordance with at least one particular bit of the at least one idle symbol of the 6-bit packet stream; and
    transmitting the ternary bit streams to a remote communication device through a cable.

11. The communication method of claim 10, wherein mapping the at least one idle symbol into the ternary bit streams in accordance with the at least one particular bit comprises:
    determining a ternary value of a first bit stream of the ternary bit streams in accordance with a binary value of a least significant bit, wherein the at least one particular bit comprises the least significant bit.

12. The communication method of claim 10, wherein mapping the at least one idle symbol into the ternary bit streams in accordance with the at least one particular bit comprises:
    determining a ternary value of a second bit stream of the ternary bit streams in accordance with binary values of a first middle bit and a most significant bit, wherein the at least one particular bit comprises the first middle bit and the most significant bit.

13. The communication method of claim 10, wherein mapping the at least one idle symbol into the ternary bit streams in accordance with the at least one particular bit comprises:
    determining a ternary value of a third bit stream of the ternary bit streams in accordance with binary values of a first middle bit and a second middle bit,
    wherein the at least one particular bit comprises the first middle bit and the second middle bit.

14. The communication method of claim 10, further comprising:
    adding at least one delimiter into the ternary bit streams, and three continuous nonzero ternary values of the at least one delimiter are not exactly the same.

15. The communication method of claim 10, wherein transforming the 4-bit packet stream into the 6-bit packet stream comprises:
    transforming the 4-bit packet stream into the 6-bit packet stream through a padding method.

16. The communication method of claim 10, wherein transforming the 4-bit packet stream into the 6-bit packet stream comprises:
    transforming the 4-bit packet stream into a 3-bit packet stream, then transform the 3-bit packet stream into the 6-bit packet stream through a first-in first-out method.

17. The communication method of claim 10, wherein transforming the 4-bit packet stream into the 6-bit packet stream comprises:
    scrambling the number of bit symbols of 0 and 1 of the 6-bit packet stream.

* * * * *